US008566093B2

(12) United States Patent
Vair et al.

(10) Patent No.: US 8,566,093 B2
(45) Date of Patent: Oct. 22, 2013

(54) INTERSESSION VARIABILITY COMPENSATION FOR AUTOMATIC EXTRACTION OF INFORMATION FROM VOICE

(75) Inventors: Claudio Vair, Turin (IT); Daniele Colibro, Turin (IT); Pietro Laface, Turin (IT)

(73) Assignee: Loquendo S.p.A., Turin (IT)

( * ) Notice: Subject to any disclaimer, the term of this patent is extended or adjusted under 35 U.S.C. 154(b) by 713 days.

(21) Appl. No.: 12/227,282

(22) PCT Filed: May 16, 2006

(86) PCT No.: PCT/EP2006/004598
§ 371 (c)(1),
(2), (4) Date: Aug. 9, 2010

(87) PCT Pub. No.: WO2007/131530
PCT Pub. Date: Nov. 22, 2007

(65) Prior Publication Data
US 2011/0040561 A1     Feb. 17, 2011

(51) Int. Cl.
*G10L 15/00*     (2013.01)

(52) U.S. Cl.
USPC .......................... 704/250; 704/246; 704/273

(58) Field of Classification Search
USPC ........................................ 704/246–250, 273
See application file for complete search history.

(56) References Cited

U.S. PATENT DOCUMENTS

| | | | | |
|---|---|---|---|---|
| 6,141,644 A | * | 10/2000 | Kuhn et al. .................... | 704/273 |
| 6,327,565 B1 | | 12/2001 | Kuhn et al. | |
| 6,519,561 B1 | * | 2/2003 | Farrell et al. .................. | 704/232 |
| 6,529,872 B1 | * | 3/2003 | Cerisara et al. ............... | 704/250 |
| 6,571,208 B1 | * | 5/2003 | Kuhn et al. .................... | 704/250 |
| 6,697,778 B1 | * | 2/2004 | Kuhn et al. .................... | 704/243 |
| 6,895,376 B2 | * | 5/2005 | Perronnin et al. ............. | 704/250 |
| 6,915,260 B2 | * | 7/2005 | Botterweck .................... | 704/250 |
| 8,050,920 B2 | * | 11/2011 | Yoma ............................. | 704/246 |
| 2002/0095287 A1 | * | 7/2002 | Botterweck .................... | 704/250 |
| 2003/0050780 A1 | * | 3/2003 | Rigazio et al. ................ | 704/246 |
| 2006/0253284 A1 | * | 11/2006 | Mami et al. ................... | 704/250 |
| 2008/0208581 A1 | * | 8/2008 | Pelecanos et al. ............ | 704/250 |
| 2008/0312926 A1 | * | 12/2008 | Vair et al. ...................... | 704/249 |
| 2009/0119103 A1 | * | 5/2009 | Gerl et al. ...................... | 704/243 |

FOREIGN PATENT DOCUMENTS

EP     0 984 431 A2     3/2000

OTHER PUBLICATIONS

Kuhn, Roland / Nguyen, Patrick / Junqua, Jean-Claude / Goldwasser, Lloyd / Niedzielski, Nancy / Fincke, Steven / Field, Ken / Contolini, Matteo (1998): "Eigenvoices for speaker adaptation", In ICSLP-1998, paper 0303.*

Vogt et al.; "Modelling Session Variability in Text-Independent Speaker Verification"; Interspeech, pp. 3117-3120, (2005).

(Continued)

*Primary Examiner* — Douglas Godbold
(74) *Attorney, Agent, or Firm* — Hamilton, Brook, Smith & Reynolds, P.C.

(57) ABSTRACT

A method for compensating inter-session variability for automatic extraction of information from an input voice signal representing an utterance of a speaker, includes: processing the input voice signal to provide feature vectors each formed by acoustic features extracted from the input voice signal at a time frame; computing an intersession variability compensation feature vector; and computing compensated feature vectors based on the extracted feature vectors and the intersession variability compensation feature vector.

22 Claims, 5 Drawing Sheets

(56) References Cited

OTHER PUBLICATIONS

Vogt et al.; "Experiments in Session Variability Modelling for Speaker Verification"; Acoustics Speech and Signal Processing, ICASSP, IEEE, pp. 1-897-1-900, (2006).
Lucey et al.; "Improved Speaker Verification Through Probabilistic Subspace Adaptation"; Eurospeech, pp. 2021-2024, (2003).
Reynolds et al.; "Speaker Verification Using Adapted Gaussian Mixture Models"; Digital Signal Processing, vol. 10, pp. 19-41, (200).
Reynolds; "Channel Robust Speaker Verification Via Feature Mapping"; MIT Lincoln Laboratory, Lexington, MA, ICASSP, pp. II-53-II-56, (2003).
Kenny et al.; "New Map Estimators for Speaker Recognition"; Eurospeech, pp. 2961-2964, (2003).

* cited by examiner

INTERSESSION VARIABILITY COMPENSATION FOR AUTOMATIC EXTRACTION OF INFORMATION FROM VOICE

CROSS REFERENCE TO RELATED APPLICATION

This application is a national phase application based on PCT/EP2006/004598, filed May 16, 2006.

TECHNICAL FIELD OF THE INVENTION

The present invention relates in general to automatic extraction of information from voice, such as automatic speaker and speech recognition, and in particular to a method and a system for compensating intersession variability of acoustic features due to intersession variable environments and communication channels.

BACKGROUND ART

As is known, a speaker recognition system is a device capable of extracting, storing and comparing biometric characteristics of human voice, and of performing, in addition to a recognition function, also a training procedure, which enables storage of voice biometric characteristics of a speaker in appropriate models, commonly referred to as voice-prints. The training procedure is to be carried out for all the speakers concerned and is preliminary to subsequent recognition steps, during which the parameters extracted from an unknown voice sample are compared with those of the voice-prints for producing the recognition result.

Two specific applications of a speaker recognition system are speaker verification and speaker identification. In the case of speaker verification, the purpose of recognition is to confirm or refuse a declaration of identity associated to the uttering of a sentence or word. The system must, that is, answer the question: "Is the speaker the person he/she says he/she is?" In the case of speaker identification, the purpose of recognition is to identify, from a finite set of speakers whose voice-prints are available, the one to which an unknown voice corresponds. The purpose of the system is in this case to answer the question: "Who does the voice belong to?".

A further classification of speaker recognition systems regards the lexical content usable by the recognition system: text-dependent speaker recognition or text-independent speaker recognition. The text-dependent case requires that the lexical content used for verification or identification should correspond to what is uttered for the creation of the voice-print: this situation is typical in voice authentication systems, in which the word or sentence uttered assumes, to all purposes and effects, the connotation of a voice password. The text-independent case does not, instead, set any constraint between the lexical content of training and that of recognition.

Hidden Markov Models (HMMs) are a classic technology used for speech and speaker recognition. In general, a model of this type consists of a certain number of states connected by transition arcs. Associated to a transition is a probability of passing from the origin state to the destination one. In addition, each state can emit symbols from a finite alphabet according to a given probability distribution. A probability density is associated to each state, which probability density is defined on a vector of acoustic features extracted from the voice at fixed time quanta (for example, every 10 ms), said vector being generated by an acoustic analysis module (acoustic front-end), and is generally referred to as observation or feature vector. The symbols emitted, on the basis of the probability density associated to the state, are hence the infinite possible feature vectors. This probability density is given by a mixture of Gaussians in the multidimensional space of them feature vectors. Example of features widely used for speaker recognition are the Mel-Frequency Cepstrum Coefficients (MFCC), and first-order time-derivative features are usually added to the basic features.

In the case of application of Hidden Markov Models to speaker recognition, in addition to previously described HMM models, with a number of states, frequently recourse is had to the so-called Gaussian Mixture Models (GMMs). A GMM is a Markov model with a single state and with a transition arc towards itself. Generally, the probability density of GMMs is constituted by a mixture of multivariate Gaussian distributions with cardinality of the order of some thousands of Gaussians. Multivariate Gaussian distributions are commonly used to model the multidimensional input feature vectors. In the case of text-independent speaker recognition, GMMs represent the category of models most widely used in the prior art.

Speaker recognition is performed by creating, during a training step, models adapted to the voice of the speakers concerned and by evaluating the probability that they generate based on feature vectors extracted from an unknown voice sample, during a subsequent recognition step. Models adapted to individual speakers, which may be either HMMs or GMMs, are commonly referred to as voice-prints. A description of voice-print training techniques which is applied to GMMs and of their use for speaker recognition is provided in Reynolds, D. A. et al., *Speaker verification using adapted Gaussian mixture models*, Digital Signal Processing 10 (2000), pp. 19-41.

One of the main causes of relevant performance degradations in automatic speech and speaker recognition is the acoustic mismatch that occurs between training and recognition conditions. In particular, in speaker recognition, errors are due not only to the similarity among voice-prints of different speakers, but also to the intrinsic variability of different utterances of the same speaker. Moreover, performance is heavily affected when a model, trained in certain conditions, is used to recognize a speaker voice collected via different microphones, channels, and environments. All these mismatching conditions are generally referred to as intersession variability.

Several proposals have been made to contrast intersession variability effects both in the feature and model domains.

A popular technique used to improve performance of a speaker recognition system by compensating the acoustical features is the Feature Mapping, a description of which may be found in D. Reynolds, *Channel Robust Speaker Verification via Feature Mapping*, in Proc. ICASSP 2003, pp. II-53-6, 2003. In particular, Feature Mapping uses the a priori information of a set of channel-dependent models, trained in known conditions, to map the feature vectors toward a channel-independent feature space. Given an input utterance, the most likely channel-dependent model is first detected and then each feature vector in the utterance is mapped to the channel-independent space based on the Gaussian selected in the channel-dependent GMM. The drawback of this approach is that it requires labeled training data to create the channel-dependent models related to the conditions that one wants to compensate.

Thus, model-based techniques have been recently proposed that are able to compensate speaker and channel variations without requiring explicit identification and labeling of different conditions. These techniques share a common background, namely modeling variability of speaker utterances constraining them to a low dimensional eigenspace. Thanks to the reduce dimension of the constrained eigenspace, model-based techniques allow robust intersession compensation even when only few speaker-dependent data is available.

In general, all the model-based eigenspace techniques construct supervectors from the acoustic models. A supervector is obtained appending the parameters of all the Gaussians of a HMM/GMM in a single list. Typically, only the mean Gaussian parameters are included in the supervectors. Considering, for instance, a 512 Gaussian GMM, modeling 13 MFCC+13 time-derivative features, a supervector of 512× 26=13312 features is generated.

The speaker or channel compensation is then performed applying the following equation:

$$\hat{\mu} = \mu + Ux \qquad (1)$$

where $\mu$ and $\hat{\mu}$ are respectively uncompensated and compensated supervectors, $Ux$ is a compensation offset, $U$ is a low-rank transformation matrix from constrained intersession variability subspace to the supervector subspace, and $x$ is a low dimensional representation of the intersession variability in the constrained intersession variability subspace.

In U.S. Pat. No. 6,327,565, U.S. Pat. No. 6,141,644 and S. Lucey, and T. Chen, *Improved Speaker Verification Through Probabilistic Subspace Adaptation*, Proc. EUROSPEECH-2003, pp. 2021-2024, 2003, the subspace matrix $U$ for speaker compensation is built collecting a large number of speaker-dependent models of different speakers and applying a linear transformation that reduces the high-dimensional supervectors into base vectors. Principal Component Analysis (PCA) is usually used to construct the transformation matrix $U$ as a concatenation of the $K$ eigenvectors corresponding to the $K$ largest eigenvalues. The selected eigenvectors are commonly known as eigenspeakers or eigenvoices because every speaker-dependent model can be near represented as a linear combination of basis vectors in the supervector domain.

A similar approach for channel compensation in speaker recognition is proposed in P. Kenny, M. Mihoubi, and P. Dumouchel, *New MAP Estimators for Speaker Recognition*, Proc. EUROSPEECH-2003, pp. 2964-2967, 2003. In particular, this technique, called in the publication eigenchannel MAP, constructs the constrained eigenspace from a large number of supervectors representing the intra-speakers variability. In order to estimate the eigenchannels, a number of speaker models, from a large collection of speakers and training set comprising several recordings of each of these speakers are needed.

In R. Vogt, B. Baker, S. Sridharan (2005): *Modelling session variability in text-independent speaker verification*, in Proc. INTERSPEECH-2005, 3117-3120, the intersession variability compensation is performed using the previous equation. In this case, transformation matrix $U$ is trained by an expectation maximization (EM) algorithm to represent the types of intra-speaker variations expected between sessions. To this end, the subspace is trained on a database containing a large number of speakers each with several independently recorded sessions. Moreover, an iterative procedure to estimate the clean speaker supervector ($\mu$ in the equation) is proposed. In the verification step each target model is compensated on a given test utterance $i$:

$$\hat{\mu}_i(s) = \mu(s) + Ux_i(s) \qquad (2)$$

Compensation is performed first estimating the low-dimensional representation of the intersession variability in recording $i$ on the speaker $s$, namely $x_i(s)$, and then compensating the speaker supervector to the recording $i$, obtaining the compensated supervector $\hat{\mu}_i(s)$. In particular, compensation is performed by computing the offset $Ux_i(s)$ in the supervector space as projection of the intersession variability vector $x_i(s)$ to the supervector space, through the low-rank transformation matrix $U$, from the constrained intersession variability subspace to the supervector space.

OBJECTIVE AND SUMMARY OF THE INVENTION

The Applicant has observed that model-based techniques allow better accuracy improvement on speaker recognition task than the feature-based compensation techniques such as Feature Mapping. However, the Applicant has observed that the aforementioned model-based techniques operate in the acoustic model domain only and thus they are heavily tied to specific acoustic models and recognition structures. Additionally, the Applicant has also observed that since in the aforementioned model-based techniques compensation is carried out model by model, in those applications in which a large amount of models are to be compensated, such as speaker identification tasks, these techniques has proved, to be computationally costly.

The objective of the present invention is therefore to provide a solution that allows the effects of the variability of the environment, microphones, channels, etc., on speaker recognition to be reduced, and in particular that is as efficient as feature-based techniques in terms of computational costs and as accurate as model-based techniques, and that allows acoustic recognition models and compensation knowledge to be decoupled, thus allowing the present invention to be applicable to different tasks and different recognition algorithms.

This object is achieved by the present invention in that it relates to a method, a system and a computer program product for compensating intersession variability for automatic extraction of information from voice, as claimed in the appended claims.

The present invention achieves the aforementioned object in two distinct phases, during which computation of intersession factors and their compensation in the acoustic feature domain is performed. In particular, the first phase, which is performed in advance and off-line, consists in the creation of a transformation that defines the constrained vector space in which intersession variability occurs, while the second step, which is repeated for every voice recording to be processed, exploits the transformation obtained in the first phase to carry out the compensation of the acoustic features. More in detail, during the first phase a small subspace able to represent the variability between speaker recordings different in terms of intersession factors is off-line constructed based on a database related to many speaker and containing, for each speaker, a significant number of voice recordings acquired under different conditions. Then, the differences between different voice recordings of the same speaker are considered, and a constrained intersession factor subspace is constructed based on these differences, using the known Principal Component Analysis technique, wherein intersession factors represent the intersession variability between different recordings of the same speaker, which are not significant for recognition of the speaker himself/herself. During the subsequent on-line phase, intersession factors are estimated for each unknown voice recording. The intersession factors are then subtracted from the feature vectors directly in the acoustic feature domain. The voice-print training and recognition steps then take place as normal, i.e., by starting from the compensated feature vectors.

The present invention allows the advantages and the accuracy of the model-based eigenspace techniques to be transferred in the acoustic feature domain. Moreover, compensating features rather than models has the advantage that the transformed features can be used as feature vectors for classifiers of different nature and complexity, and also for different tasks such as language or speech recognition.

BRIEF DESCRIPTION OF THE DRAWINGS

For a better understanding of the present invention, a preferred embodiment, which is intended purely by way of example and is not to be construed as limiting, will now be described with reference to the attached drawings, wherein.

DETAILED DESCRIPTION OF PREFERRED EMBODIMENTS OF THE INVENTION

The following discussion is presented to enable a person skilled in the art to make and use the invention. Various modifications to the embodiments will be readily apparent to those skilled in the art, and the generic principles herein may be applied to other embodiments and applications without departing from the spirit and scope of the present invention. Thus, the present invention is not intended to be limited to the embodiments shown, but is to be accorded the widest scope consistent with the principles and features disclosed herein and defined in the attached claims.

In addition, the present invention is implemented by means of a computer program product including software code portions for implementing, when the computer program product is loaded in a memory of the processing system and run on the processing system, the intersession variability compensation method described hereinafter with reference to FIGS. 2, 3 and 4.

Figure 1:
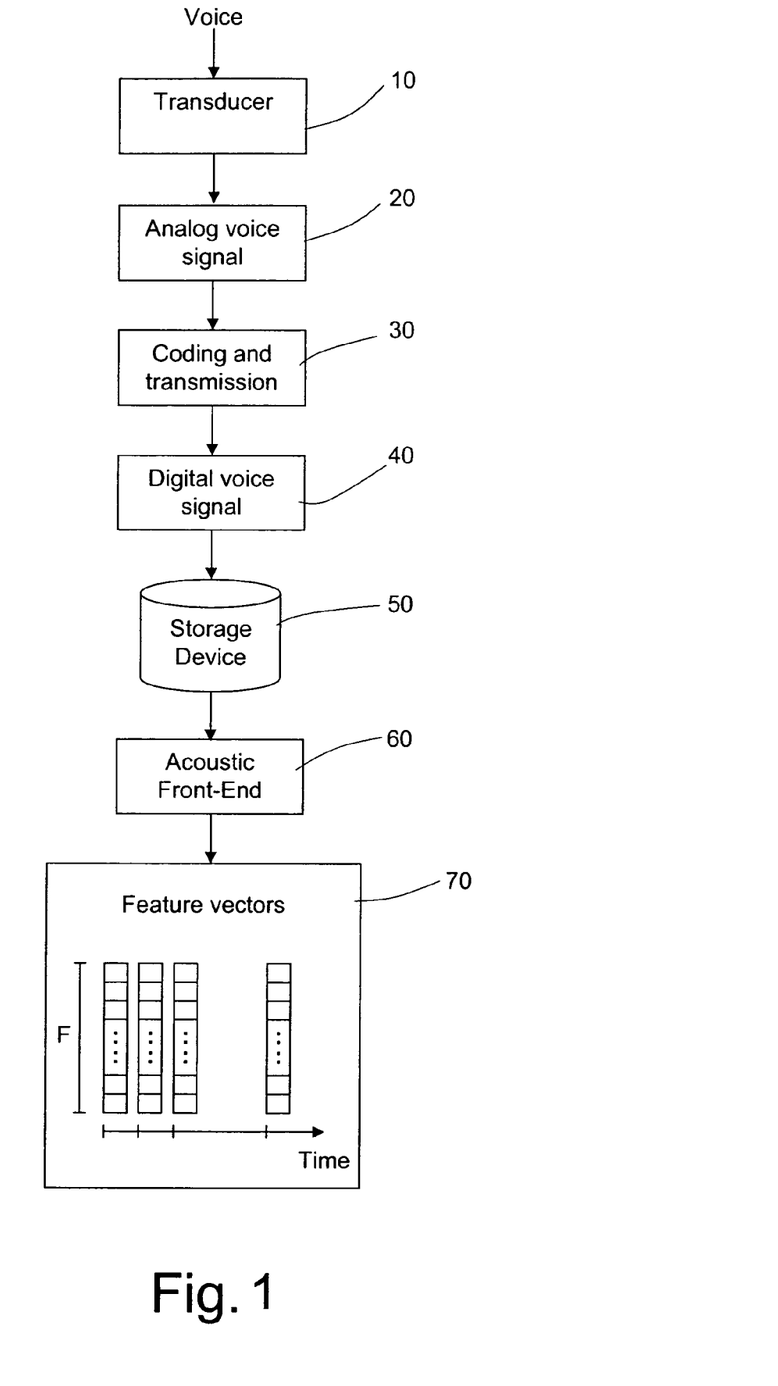
FIG. 1 shows a block diagram of voice acquisition and processing.

FIG. 1 shows a flowchart of acquisition and processing of a voice signal, generated by a speaker and captured by a microphone transducer, to obtain acoustic features which are necessary during both steps of the present invention. In particular, speaker voice is captured by an acquisition transducer (block 10), that can be either a microphone of a fixed or a mobile telephone handset or a microphone of a recording system, which acquisition transducer outputs an analog voice signal (block 20), which is then digitized and coded, before or after possible transmission (block 30). The digital voice signal so obtained (block 40), is normally recorded in a non-volatile storage device, such as the secondary storage system of a computer system (block 50), and processed by an acoustic front-end (block 60), which outputs, at fixed time quanta or frames, typically ten milliseconds, a feature vector (block 70), which is a compact vector representation of the voice. In a preferred embodiment, each feature vector is made up of Mel-Frequency Cepstrum Coefficients (MFCCs). The order of filter bank and of Discrete Cosine Transform (DCT) used in the generation of the MFCCs can be 13. In addition, each observation vector may also conveniently include first-order time derivative of each MFCCs, for a total of 13+13=26 features for each frame.

Figure 2:
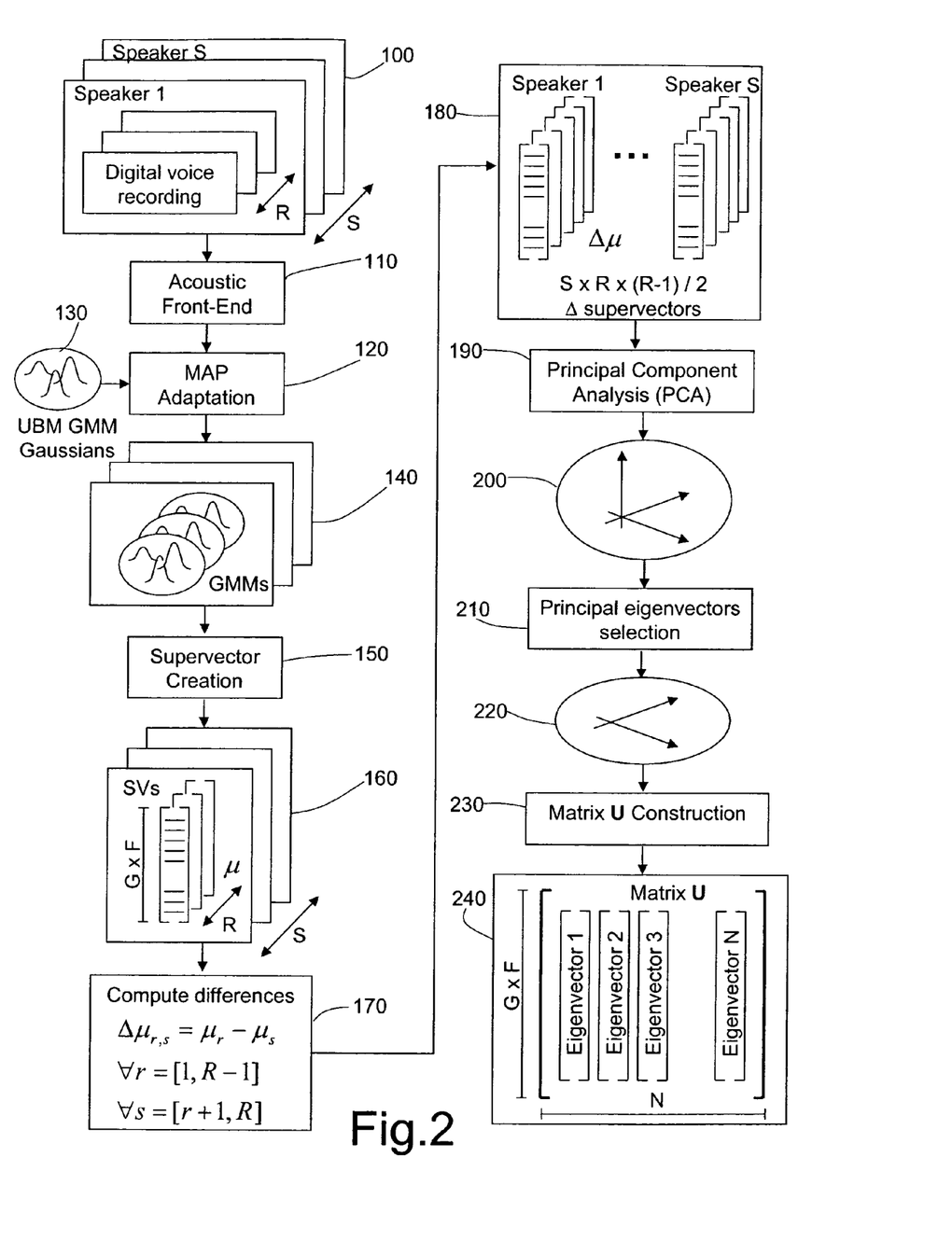
FIG. 2 shows a detailed flowchart of intersession variability subspace matrix construction.

FIG. 2 shows a flowchart of the first step of the present invention, namely creation of intersession variability subspace.

Performance of the first step requires availability of a voice database (block 100) relating to a large group of S speakers, and containing, for each speaker, a number R of voice recordings acquired under different conditions, so as to cover the intersession variability that it is intended to compensate.

Based on this voice database, an acoustic front-end (block 110) extracts from each digital voice sample feature vectors based on which a GMM is created for each speaker and in each of the available acquisition conditions using an adaptation technique commonly known as Maximum A Posteriori (MAP) adaptation technique (block 120) which is a technique widely used for speaker recognition and which is based on a general model of the acoustic space, commonly referred to as Universal Background Model (UBM) (block 130). The UBM is a GMM and constitutes the "root" from which all adapted models (block 140) are derived using the MAP adaptation technique. The adapted models therefore maintain the same characteristics of the UBM, in terms of parameters represented and topology, and, in particular, keep the same number of Gaussians and acoustic features. Considering R recordings for S speakers, R×S adapted GMMs will be created. The method can easily be generalized to the case where the speakers have a number of recordings that are different from each other.

For each of the R×S adapted GMMs, a corresponding supervector is created (blocks 150 and 160) by arraying the parameters of the adapted GMM. In a preferred embodiment, only the vectors formed by the mean values of all the Gaussians, hereinafter referred to as mean vector, are concatenated, disregarding other parameters, such as weights and covariance. Assuming that the GMM is formed by G Gaussians and that each mean vector has a dimension F (the same as the feature vectors, 26 in the embodiment considered), a supervector will be composed of G×F parameters. Considering S speakers and R recordings per speaker, R×S supervectors are created, each made up of G×F parameters. In a preferred embodiment, the Gaussians are ordered and examined in ascending order, and the corresponding mean vectors are then concatenated to form the supervectors. The ordering of the Gaussians is not significant, as long as it is kept constant for the generation of the supervectors. In a preferred embodiment, 512 multivariate Gaussians are used, each related to an acoustic phenomenon in the space of the 26 parameters of the feature vectors: each supervector is thus composed of 512× 26=13312 parameters.

In a preferred embodiment, the supervectors related to the GMMs of the same speaker, acquired under different conditions, are examined in pairs, so as to highlight the effect, in the supervectors' acoustic space, of passage from session conditions of the first supervector of the pair to session conditions of the second supervector of the same speaker. In particular, this operation is performed by computing a difference supervector for each pair as a vector difference between the two supervectors of the pair, and is repeated for all of the pairs available for a speaker and for all speakers (block 170). The total number of difference supervectors that can be obtained with S speakers and R recordings per speaker is S×R×(R−1)/2 (block 180).

After constructing the supervectors a dimensionality reduction operation is performed through a linear transformation that reduces the original high-dimensional supervectors into basis vectors. In particular, in a preferred embodiment the difference supervectors are processed according to an analysis technique commonly know as Principal Component Analysis (PCA) technique (block 190). In particular, each difference supervector represents a point in a supervector space with dimensions G×F, and the PCA technique determines a group of Principal Component Vectors (block 200) which define a complete base of eigenvectors for the supervector space such that all the difference supervectors inputted to the PCA algorithm (observed points) may be generated. If the difference supervectors are linearly independent of each other, the number of eigenvectors necessary for precisely reconstructing them is equal to the number of inputted difference supervectors. Should that not be the case, as happens when the difference supervectors of the supervector pairs are introduced, the number of eigenvectors required is less than the number of difference supervectors.

Another important property of the PCA technique exploited by the proposed method is that the eigenvectors are ordered in terms of decreasing importance, as a function of the eigenvalue associated with the eigenvector, i.e. the first most important eigenvector is associate with the highest eigenvalue, the second most important eigenvector is associate with the second eigenvalue, and so on. The term "importance" is quantifiable in terms of how much part of the initial vector space's variance is described by a small number of eigenvectors chosen from those with highest eigenvalues (block 210). The PCA technique guarantees that the increase in variance captured by the eigenvectors decreases with their order, and therefore it is possible to approximately represent the points of the initial complete vector space in a reduced-dimension vector space (block 220) described by a small number of eigenvectors, chosen from those with higher eigenvalues, with the assurance of representing the principal components.

In the proposed method, the eigenvectors obtained from the difference supervectors with the PCA technique allow the variability introduced by session variations to be described in the constrained subspace of the eigenvectors. To represent the principal components affected by intersession variability, only the eigenvectors with the highest N eigenvalues, with N<100<<(G×F), are considered for building the base of the intersession variability subspace. The chosen N eigenvectors are grouped into columns to form the transformation matrix U, with N columns and (G×F) rows. The transformation matrix U defines the intersession variability constrained subspace (blocks 230 and 240).

The second step of the present invention provides for the application of the previously described compensation equation (2) to the UBM, assuming that the distortion of the acoustic space in the recording i and characterized by the vector $x_i$ in the constrained intersession variability subspace is estimable starting from the UBM. Compensation equation (2) can be rewritten eliminating reference to the speaker (as the supervectors regard the UBM) and making the index m of each Gaussian that forms a supervector explicit:

$$\hat{\mu}_{i,m} = \mu_m + U_m x_i \qquad (3)$$

where $\mu_m$ e $\hat{\mu}_{i,m}$ are respectively subvectors of the uncompensated and compensated supervectors and associated with the m-th Gaussian of the UBM, $U_m$ is a submatrix of F rows and N columns of the transformation matrix U and associated with the m-th Gaussian, and $x_i$ is the compensation vector for the recording i, also referred to as intersession factor vector, in the constrained subspace.

In order to estimate the intersession factor vectors $x_i$, the present invention exploits a known technique commonly referred to as Probabilistic Subspace Adaptation (PSA), for a detailed description of which reference may be made to the aforementioned publication *Improved Speaker Verification Through Probabilistic Subspace Adaptation*.

Figure 3:
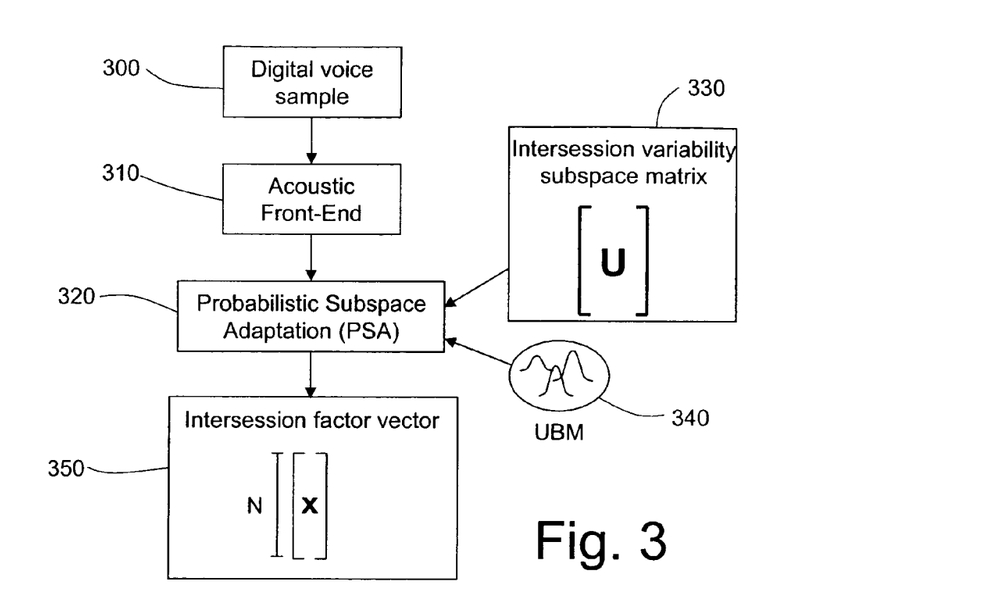
FIG. 3 shows a general flowchart of intersession factor vector estimation.

FIG. 3 shows a general flowchart of a intersession factor vector estimation. A digital voice sample (block 300) is inputted to an acoustic front-end (block 310) and the feature vectors outputted by the acoustic front-end are subjected to the Probabilistic Subspace Adaptation (block 320), which requires the knowledge of the transformation matrix U (block 330) and of the UBM (block 340), and provides the corresponding intersession factor vector $x_i$ (block 350).

Compensation of the acoustic features is then obtained by projecting the intersession factor vectors $x_i$ from the constrained intersession variability subspace back to the extended acoustic model space. In particular, each projection $U_m x_i$ generates a feature compensation vector with a dimension equal to that of the feature vectors. The feature compensation contributions regarding the various Gaussians of the UBM are weighted with the occupation probability $\gamma_m(t)$ of the Gaussians, given the feature vector. A compensation contribution is calculated for each time quantum t and is subtracted from each original feature vector $O_i(t)$, corresponding to the recording i. The compensated feature vectors $\hat{O}_i(t)$ are then obtained via the following equation:

$$\hat{o}_i(t) = o_i(t) - \sum_m \gamma_m(t) U_m x_i \qquad (4)$$

where $$\sum_m \gamma_m(t) U_m x_i$$

represents an intersession variability compensation feature vector to be subtracted from each original feature vector $O_i(t)$ to obtain the compensated feature vectors $\hat{O}_i(t)$.

In practical experience, compensation may be carried out including just a limited number of terms in the summation, in particular those associated with the Gaussians that present the highest occupation probability at each time t.

Figure 4:
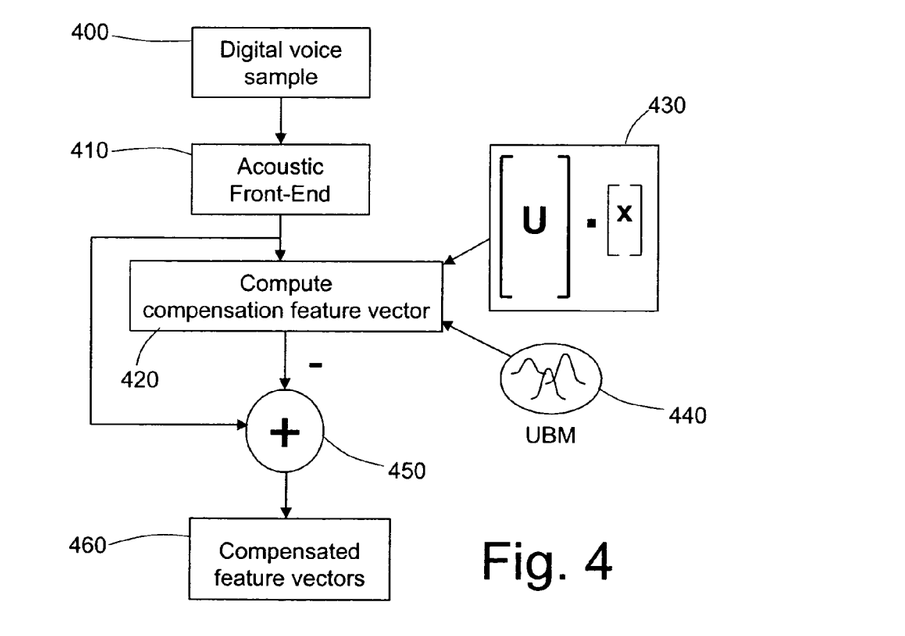
FIG. 4 shows a general flowchart of acoustic feature compensation.

FIG. 4 shows flowchart of acoustic feature compensation. A digital voice sample in a recording i (block 400) is inputted to an acoustic front-end (block 410) and the feature vectors outputted by the acoustic front-end are used to compute the feature compensation vectors (block 420), which computation requires the knowledge of the projections Ux (block 430) and of the UBM (block 440). The feature compensation vectors are then subtracted from the feature vectors outputted by the acoustic front-end (block 450), thus obtaining the corresponding compensated feature vectors (block 460).

In the case of speaker recognition, the present invention is applied during both speaker voice-print creation and speaker verification/identification. However, good recognition results are achievable by applying the present invention to just the speaker verification, without normalizing the feature vectors during training.

The advantages of the present invention are evident from the foregoing.

Additionally, it is emphasized that as the present invention operates in the acoustic feature domain, it can be used in contexts and applications other than those previously described.

In the field of speaker recognition via GMM, it is possible to differentiate the UBM used for the compensation of acoustic features from that used for the modeling of the speakers. For example, a UBM with a small number of Gaussians (e.g. 512) could be used for compensation via intersession factors and more detailed models for modeling the speakers (e.g. 2048 Gaussians).

Always within the context of speaker recognition, it is possible to use the described method to adapt the parameters inputted to other types of classifiers, such as HMM models or Support Vector Machines (SVM).

The described method can also find application in the context of language recognition, where intersession variability compensation is just as important as in the case of speaker recognition. Also in this case, the method can be used in preprocessing to eliminate intersession variability from the feature vectors used for language recognition.

Figure 5:
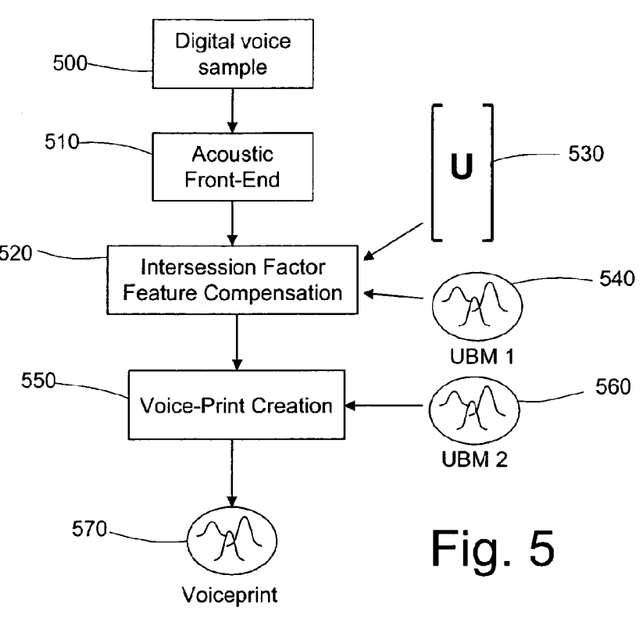
FIG. 5 shows a general flowchart of speaker voice-print creation.

As an example, FIG. 5 shows a basic flowchart of speaker voice-print creation, where a digital voice sample (block 500) is inputted to an acoustic front-end (block 510), and the feature vectors outputted by the acoustic front-end are used to compensate intersession variability (block 520) based on the transformation matrix U (block 530) and a first UBM (e.g. with 512 Gaussians) (block 540), as previously described. The compensated feature vectors are then used for the speaker voice-print creation (block 550) based on a second UBM (e.g. with 2048 Gaussians) (block 560), thus obtaining the speaker voice-print (block 570). In a different embodiment, the first and second UBMs may be the same.

Figure 6:
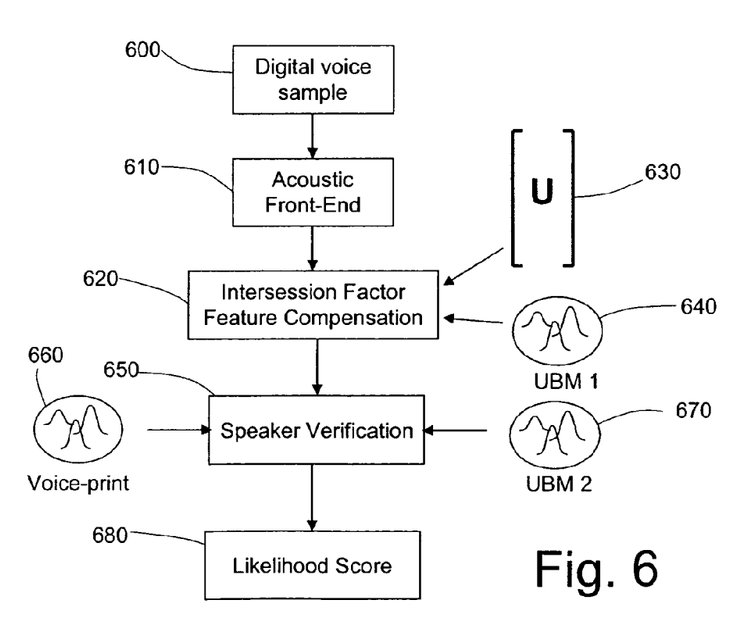
FIG. 6 shows a general flowchart of speaker verification.

As a further example, FIG. 6 shows a basic flowchart of a speaker verification, where a digital voice sample (block 600) is inputted to an acoustic front-end (block 610), and the feature vectors outputted by the acoustic front-end are used to compensate intersession variability (block 620) based on the transformation matrix U (block 630) and a first UBM (e.g. with 512 Gaussians) (block 640), as previously described. The compensated feature vectors are then used for the speaker verification (block 650) based on speaker voice-print (block 660) and a second UBM (e.g. with 2048 Gaussians) (block 670), thus obtaining a likelihood score (block 680). In a different embodiment, the first and the second UBMs may be the same.

Figure 7:
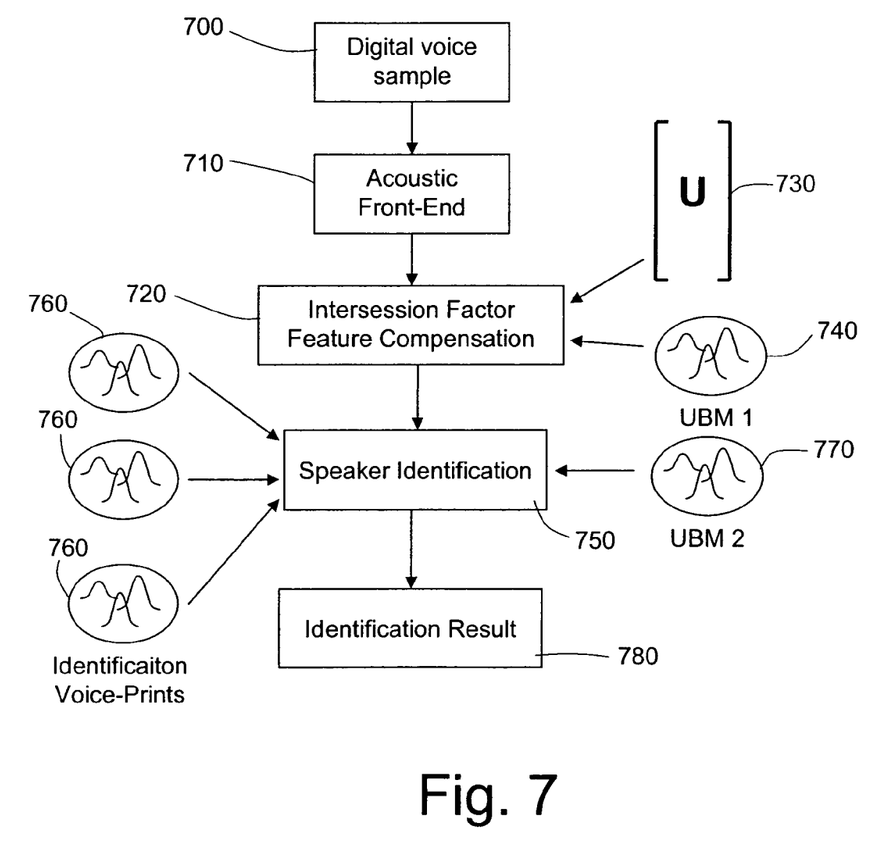
FIG. 7 shows a general flowchart of speaker identification.

Finally, as a yet further example, FIG. 7 shows a basic flowchart of a speaker identification, where a digital voice sample (block 700) is inputted to an acoustic front-end (block 710), and the feature vectors outputted by the acoustic front-end are used to compensate intersession variability (block 720) based on the transformation matrix U (block 730) and a first UBM (e.g. with 512 Gaussians) (block 740), as previously described. The compensated feature vectors are then used for the speaker identification (block 750) based on speaker voice-prints (blocks 760) and a second (e.g. with 2048 Gaussians) UBM (block 770), thus obtaining an identification result (block 780). In a different embodiment, the first and the second UBMs may be the same.

Finally, it is clear that numerous modifications and variants can be made to the present invention, all falling within the scope of the invention, as defined in the appended claims.

In particular, as the proposed method performs compensation at acoustic features level, it can also be used in contexts and applications other than those previously described, such as language and speech recognition, where channel variability compensation is just as important as in the case of speaker recognition. Also in these applications, the present invention may be used as a preprocessing to eliminate channel variability from the observation vectors used for language and speech recognition.

Besides, always within the context of speaker recognition, it is possible to use the described method to adapt the parameters that feed other types of classifiers, such as HMM models or Support Vector Machines (SVM).

Additionally, intersession variability may be compensated based on a UBM different than a GMM, for example a HMM. In this case, each supervector is formed by concatenating mean vectors of all Gaussians in all states of the HMM.

Moreover, transformation matrix U may be computed based on an analysis technique different than the PCA, for example Expectation Maximization PCA (EMPCA), Independent Component Analysis (ICA), Linear Discriminant Analysis (LDA), Factor Analysis (FA), and Singular Value Decomposition (SVD), as well as intersession factor vector $x_i$ may be computed based on an adaptation technique different than the PSA, for example Maximum Likelihood Eigen-Decomposition (MLED).

Finally the compensation process may be applied iteratively on portions of a whole recording, trough repeating the described algorithms for each portion of the recording itself. In this case each whole recording portion p will have an associated intersession factor vector $x_{ip}$, said intersession factor vector $x_{ip}$ to be considered for compensating the feature vectors concerning the related recording portion.

The invention claimed is:

1. A method for compensating intersession variability for automatic extraction of information from an input voice signal representing an utterance of a speaker, the method comprising:

preprocessing the input voice signal to provide feature vectors that include acoustic features extracted from the input voice signal;

computing an intersession variability compensation feature vector by:
using a voice recording database including voice recordings of different speakers, computing an intersession variability subspace matrix that defines a transformation from an acoustic model space to an intersession variability subspace representing intersession variability for the speakers;
computing, based on the input voice signal and the intersession variability subspace matrix, an intersession factor vector representing the intersession variability of the input voice signal in the intersession variability subspace; and
computing the intersession variability compensation feature vector based on the intersession variability subspace matrix, the intersession factor vector, and a universal background model; and computing compensated feature vectors by subtracting the intersession variability compensation feature vector from the extracted feature vectors.

2. The method of claim 1, wherein the universal background model is created based on a training voice database, the universal background model including a number of Gaussians and probabilistically modeling of an acoustic model space.

3. The method of claim 2, wherein computing the intersession variability compensation feature vector based on the intersession variability subspace matrix, the intersession factor vector, and the universal background model comprises:

computing intersession variability compensation contributions ($U_m x_i$), one for each Gaussian of the universal background model, based on the intersession variability subspace matrix (U) and the intersession factor vector ($x_i$); and weighting the intersession variability compensation contributions ($U_m x_i$) with occupation probability (($_m$(t)) of respective Gaussians, given a feature vector.

4. The method of claim 3, wherein computing intersession variability compensation contributions ($U_m x_i$) comprises:

multiplying the intersession factor vector ($x_i$) by a submatrix ($U_m$) of the intersession variability subspace matrix (U) related to a corresponding Gaussian of the universal background model.

5. The method of claim 4, wherein each compensated feature vector is computed based on the following formula:

$$\hat{O}_i(t) = O_i(t) - \sum_m \gamma_m(t) U_m x_i$$

wherein $\hat{O}_i(t)$ is the compensated feature vector, $O_i(t)$ is the extracted feature vector, $x_i$ is the intersession factor vector, i identifies the input speech signal, m identifies the Gaussian of the universal background model, $U_m$ is the submatrix of the intersession variability subspace matrix U and related to the m-th Gaussian, and ($_m$(t) is the occupation probability of the m-th Gaussian at time frame t.

6. The method of claim 1, wherein determining an intersession factor vector comprises:

performing an estimation technique on the feature vectors based on the intersession variability subspace matrix and the universal background model.

7. The method of claim 6, wherein the estimation technique is probabilistic subspace adaptation or maximum likelihood eigen-decomposition adaptation.

8. The method of claim 1, wherein determining an intersession variability subspace matrix comprises:

computing a Gaussian model for each speaker and for each voice recording in the voice database, each Gaussian model comprising a number of Gaussians;

computing a supervector for each Gaussian Model; and computing the intersession variability subspace matrix based on super-vectors.

9. The method of claim 8, wherein computing a Gaussian model comprises:

adapting the universal background model based on the feature vectors.

10. The method of claim 9, wherein adapting the universal background model comprises:

performing maximum a posteriori adaptation of the universal background model.

11. The method of claim 8, wherein computing a supervector comprises:

forming mean vectors with mean values of all the Gaussians of the Gaussian model; and concatenating the mean vectors.

12. The method of claim 11, wherein forming mean vectors comprises:

numbering the Gaussians of the Gaussian model; and considering the Gaussians in ascending order.

13. The method of claim 8, wherein computing the intersession variability subspace matrix based on the super-vectors comprises:

for each speaker, computing a difference supervector for each pair of supervectors related to the Gaussian models of the speaker as a vector difference between two supervectors of the pair; and performing dimensionality reduction on the difference supervectors to generate a group of eigenvectors that define supervector space; and computing the intersession variability subspace matrix based on the eigenvectors.

14. The method of claim 13, wherein performing dimensionality reduction comprises:

choosing specific eigenvectors according to a given criterion; and computing the intersession variability subspace matrix based on the chosen eigenvectors.

15. The method of claim 14, wherein computing the intersession variability subspace matrix based on the chosen eigenvectors comprises:

grouping the chosen eigenvectors into columns to form the intersession variability subspace matrix.

16. The method of claim 14, wherein each eigenvector is associated with a respective eigenvalue, and wherein choosing specific eigenvectors according to a given criterion comprises:

choosing the eigenvectors with the highest eigenvalues.

17. The method of claim 13, wherein performing dimensionality reduction on the difference supervectors comprises:

performing one of the following techniques: principal component analysis, expectation maximization principal component analysis, independent component analysis, linear discriminant analysis, factor analysis, and singular value decomposition.

18. The method of claim 8, wherein the Gaussian model is a Gaussian mixture model or a hidden markov model.

19. A method for automatically extracting information from an input voice signal representing an utterance of a speaker, comprising implementing the intersession variability compensation method of claim 1.

20. A system for compensating intersession variability for automatic extraction of information from an input voice signal representing an utterance of a speaker, the system comprising one or more processors configured to implement intersession variability compensation by:

preprocessing the input voice signal to provide feature vectors that include acoustic features extracted from the input voice signal;

computing an intersession variability compensation feature vector by:

using a voice recording database including voice recordings of different speakers, computing an intersession variability subspace matrix that defines a transformation from an acoustic model space to an intersession variability subspace representing intersession variability for the speakers;

computing, based on the input voice signal and the intersession variability subspace matrix, an intersession factor vector representing the intersession variability of the input voice signal in the intersession variability subspace; and computing the intersession variability compensation feature vector based on the intersession variability subspace matrix, the intersession factor vector and a universal background model; and computing compensated feature vectors by subtracting the intersession variability compensation feature vector from the extracted feature vectors.

21. A system for automatically extracting information from an input voice signal representing an utterance of a speaker, the system comprising one or more processors configured to perform intersession variability compensation by:
- preprocessing the input voice signal to provide feature vectors that include acoustic features extracted from the input voice signal;
- computing an intersession variability compensation feature vector by:
  - using a voice recording database including voice recordings of different speakers, computing an intersession variability subspace matrix that defines a transformation from an acoustic model space to an intersession variability subspace representing intersession variability for the speakers;
  - computing, based on the input voice signal and the intersession variability subspace matrix, an intersession factor vector representing the intersession variability of the input voice signal in the intersession variability subspace; and
  - computing the intersession variability compensation feature vector based on the intersession variability subspace matrix, the intersession factor vector and a universal background model; and
- computing compensated feature vectors by subtracting the intersession variability compensation feature vector from the extracted feature vectors.

22. A non-transitory computer-readable medium having computer readable instructions embodied thereon and configured, when loaded and executed by one or more computer processors, to cause the one or more processors to perform intersession variability compensation by:
- preprocessing the input voice signal to provide feature vectors that include acoustic features extracted from the input voice signal;
- computing an intersession variability compensation feature vector by:
  - using a voice recording database including voice recordings of different speakers, computing an intersession variability subspace matrix that defines a transformation from an acoustic model space to an intersession variability subspace representing intersession variability for the speakers;
  - computing, based on the input voice signal and the intersession variability subspace matrix, an intersession factor vector representing the intersession variability of the input voice signal in the intersession variability subspace; and
  - computing the intersession variability compensation feature vector based on the intersession variability subspace matrix, the intersession factor vector and a universal background model; and
- computing compensated feature vectors by subtracting the intersession variability compensation feature vector from the extracted feature vectors.

* * * * *

UNITED STATES PATENT AND TRADEMARK OFFICE
CERTIFICATE OF CORRECTION

PATENT NO. : 8,566,093 B2  Page 1 of 1
APPLICATION NO. : 12/227282
DATED : October 22, 2013
INVENTOR(S) : Vair et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1344 days.

Signed and Sealed this

Fifteenth Day of September, 2015

Michelle K. Lee
*Director of the United States Patent and Trademark Office*